(12) United States Patent
Matsuura et al.

(10) Patent No.: US 8,777,336 B2
(45) Date of Patent: Jul. 15, 2014

(54) BRAKE APPARATUS FOR VEHICLE

(75) Inventors: Masahiro Matsuura, Chiryu (JP);
Masayuki Naito, Nagakute (JP);
Kazuya Morishita, Obu (JP);
Masayoshi Oishi, Anjo (JP)

(73) Assignee: Advics Co., Ltd., Kariya-Shi (JP)

( * ) Notice: Subject to any disclaimer, the term of this patent is extended or adjusted under 35 U.S.C. 154(b) by 47 days.

(21) Appl. No.: 13/532,563

(22) Filed: Jun. 25, 2012

(65) Prior Publication Data

US 2013/0057051 A1 Mar. 7, 2013

(30) Foreign Application Priority Data

Jun. 24, 2011 (JP) ................................. 2011-140894

(51) Int. Cl.
*B60T 8/60* (2006.01)

(52) U.S. Cl.
USPC ............................................ 303/155; 303/10

(58) Field of Classification Search
USPC ........... 303/3, 10, 15, 20, 152, 155; 180/65.1, 180/65.31
See application file for complete search history.

(56) References Cited

U.S. PATENT DOCUMENTS

| 5,335,982 | A | * | 8/1994 | Ando et al. ................. 303/117.1 |
| 6,113,197 | A | * | 9/2000 | Kuroki et al. .................... 303/11 |
| 2005/0269875 | A1 | | 12/2005 | Maki et al. |
| 2007/0284936 | A1 | * | 12/2007 | Maki et al. ....................... 303/15 |
| 2009/0243382 | A1 | * | 10/2009 | Yamauchi et al. ............. 303/155 |
| 2013/0026817 | A1 | * | 1/2013 | Morishita et al. ................. 303/3 |

FOREIGN PATENT DOCUMENTS

| JP | 10-119748 A | 5/1998 |
| JP | 2006-021745 A | 1/2006 |

* cited by examiner

*Primary Examiner* — Christopher Schwartz
(74) *Attorney, Agent, or Firm* — Buchanan Ingersoll & Rooney PC

(57) ABSTRACT

A brake apparatus includes: a master cylinder generating a master cylinder fluid pressure; a wheel brake device applying a braking force to the wheels; a control fluid pressure generation device including a fluid pressure control valve and a fluid pressure pump; an electric motor driving the fluid pressure pump; a control fluid pressure setting unit setting a control fluid pressure; wherein the control fluid pressure generation device rotates the electric motor to circulate a brake fluid and applies a control current to the fluid pressure control valve to thus generate the control fluid pressure in the fluid pressure control valve, and a target rotation number setting unit configured to calculate a pump-necessary discharge flow rate and a brake fluid amount, and set a target rotation number of the electric motor based on the pump-necessary discharge flow rate.

7 Claims, 10 Drawing Sheets difference (ΔFrs) between regenerative braking force (Fr) corresponding to brake operation and regenerative braking force (Fs) to be generated

BRAKE APPARATUS FOR VEHICLE

CROSS-REFERENCE TO RELATED APPLICATION

This application is based upon and claims the benefit of priority of Japanese Patent Application No. 2011-140894 filed on Jun. 24, 2011, the contents of which are incorporated herein by reference in its entirety.

BACKGROUND

The invention relates to a brake apparatus for a vehicle that generates a control fluid pressure braking force for compensating for a deficiency of a braking force to be applied to wheels in response to a brake operating state.

For example, JP-A-2006-21745 discloses a brake apparatus for a vehicle having a fluid pressure brake apparatus and a regenerative brake device. The fluid pressure brake apparatus generates a basic fluid pressure corresponding to a brake operation by a master cylinder, and applies the generated basic fluid pressure to wheel cylinders of the respective wheels connected by an oil path having the master cylinder and a fluid pressure control valve, thereby generating a basic fluid pressure braking force for each wheel. The fluid pressure brake apparatus drives an electric motor in response to a control fluid pressure command value to thus drive a fluid pressure pump provided to the fluid pressure control valve and to thus generate a control fluid pressure and applies the generated control fluid pressure to the wheel cylinders, thereby generating a control fluid pressure braking force for each wheel. The regenerative brake device generates a regenerative braking force corresponding to a brake operating state for any one of the wheels.

In the brake apparatus for a vehicle, when the regenerative braking force varies in response to a driver-request braking force and thus proves deficient, the deficiency of the regenerative braking force is compensated by the control fluid pressure braking force. That is, the electric motor is driven at high rotation number all the time to thus increase a discharge flow rate of a fluid pressure pump and a brake fluid having an unnecessary flow rate part regarding a necessary flow rate part is made to escape from the fluid pressure control valve to the master cylinder, thereby adjusting the control fluid pressure. According to the above brake apparatus for a vehicle, it is possible to cope with a situation where the regenerative braking force proves deficient with respect to the request braking force, with good responsiveness, as required.

JP-A-10-119748 discloses a brake apparatus for a vehicle having a device that controls a motor rotation number to thus change a discharge flow rate of a pump and thus controls a control fluid pressure. According to this brake apparatus for a vehicle, when it is required to increase flow rate consumption of a brake fluid pressure due to an operation of rapidly pedaling a brake, it is possible to enhance the responsiveness by increasing the motor rotation number to thereby increase the discharge flow rate of the pump.

In the brake apparatus for a vehicle having the fluid pressure brake apparatus and the regenerative brake device, the durability of the electric motor, which drives the fluid pressure pump for generating the control fluid pressure frequently operating in a brake region, is important. According to the brake apparatus for a vehicle disclosed in JP-A-2006-21745, the electric motor should be driven at high rotation number all the time, so that the lifespan of the electric motor may end at an early stage. According to the brake apparatus for a vehicle disclosed in JP-A-10-119748, since the motor rotation number is controlled so as to change the discharge flow rate of the pump, it is possible to increase the durability of the electric motor. However, since the pedaling degree of the brake pedal varies every moment, the load to be applied to the fluid pressure pump is also varied. Regarding this, it is not suggested how to control the motor rotation number at this situation.

SUMMARY

The invention has been made to solve the above problems. An object is to provide a brake apparatus for a vehicle capable of improving the durability of an electric motor that drives a fluid pressure pump of generating a control fluid pressure.

In order to achieve the objective, there is provided an improved brake apparatus for vehicle which includes:

a master cylinder configured to generate a master cylinder fluid pressure corresponding to a brake operation;

a wheel brake device that is provided for each wheel and configured to apply a braking force to the wheels by supplying a brake fluid from the master cylinder to wheel cylinders;

a control fluid pressure generation device including:
  a fluid pressure control valve connected between the master cylinder and the wheel cylinders; and
  a fluid pressure pump having a discharge port communicating between the fluid pressure control valve and the wheel cylinders and a suction port communicating between the master cylinder and the fluid pressure control valve;

an electric motor configured to drive the fluid pressure pump;

a control fluid pressure setting unit configured to set a control fluid pressure to be added to the master cylinder fluid pressure so that a wheel cylinder fluid pressure occurring in the wheel cylinder is higher than the master cylinder fluid pressure;

wherein the control fluid pressure generation device rotates the electric motor with a target rotation number to circulate a brake fluid having a relief flow rate necessary to operate the fluid pressure control valve from the fluid pressure pump to the fluid pressure control valve and applies a control current to the fluid pressure control valve to thus generate the control fluid pressure in the fluid pressure control valve, and a target rotation number setting unit configured to calculate a pump-necessary discharge flow rate based on the relief flow rate and a brake fluid amount that is supplied to the wheel cylinders based on a change in the control fluid pressure, and set a target rotation number of the electric motor based on the pump-necessary discharge flow rate.

DESCRIPTION OF EXEMPLARY EMBODIMENTS

Figure 1:
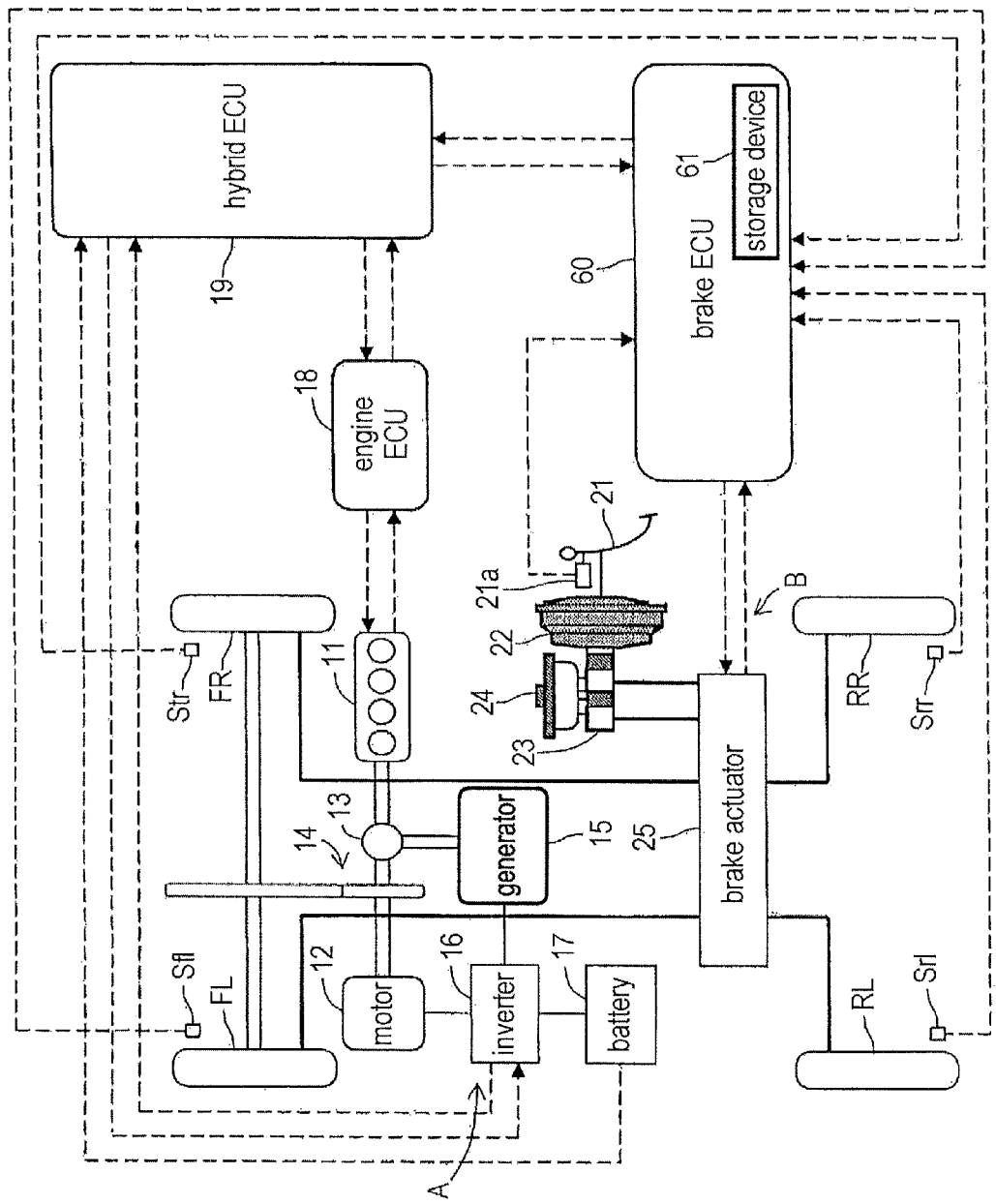
FIG. 1 is an outline view showing a vehicle to which a brake apparatus for a vehicle according to an exemplary embodiment is applied.

Hereinafter, a hybrid vehicle including a brake apparatus for a vehicle according to an exemplary embodiment will be described with reference to the drawings. As shown in FIG. 1, the brake apparatus for a vehicle is configured so that it is applied to a hybrid vehicle, and has a fluid pressure brake apparatus B, a regenerative brake device A, a brake ECU (electronic control unit) 60 that cooperatively controls the fluid pressure brake apparatus B and the regenerative brake device A, a hybrid ECU (electronic control unit) 19 that controls a motor 12, which is a driving source of the hybrid vehicle, via an inverter 16 in response to a request value from the brake ECU 60, and the like.

The hybrid vehicle is a vehicle that drives driving wheels, for example left and right front wheels FL, FR by a hybrid system. The hybrid system is a power train that combines and uses two types of driving sources, i.e., an engine 11 and the motor 12. The hybrid system includes a parallel hybrid system that directly drives the wheels from the engine 11 and the motor 12 and a series hybrid system in which the wheels are driven by the motor 12 and the engine 11 serves as a power feeding source to the motor 12. The hybrid vehicle of this exemplary embodiment is mounted with the parallel hybrid system.

In the hybrid vehicle having the parallel hybrid system mounted thereto, a driving force of the engine 11 is transmitted to driving wheels (left and right front wheels FL, FR, in this exemplary embodiment) via a power division mechanism 13 and a power transmission mechanism 14 and a driving force of the motor 12 is transmitted to the driving wheels via the power transmission mechanism 14. The power division mechanism 13 appropriately divides the driving force of the engine 11 into a vehicle driving force and a generator driving force. The power transmission mechanism 14 appropriately combines the driving forces of the engine 11 and the motor 12 depending on driving conditions and transmits the same to the driving wheels. The power transmission mechanism 14 adjusts a ratio of the driving forces to be transmitted from the engine 11 and the motor 12 within a range of 0:100 to 100:0. The power transmission mechanism 14 has a speed changing function.

The engine 11 is controlled by an engine ECU (electronic control unit) 18, and the engine ECU 18 outputs an opening command to an electronic control throttle (not shown) in response to an engine output request value from the hybrid ECU 19 that will be described later, thereby adjusting a rotation number of the engine 11. The motor 12 assists an output of the engine 11 to thus increase the driving force thereof, and performs electric generation to thereby charge a battery 17 upon braking of the vehicle. A generator 15 performs the electric generation by the output of the engine 11, and has a starter function upon starting of the engine. The motor 12 and the generator 15 are electrically connected to the inverter 16, respectively. The inverter 16 is electrically connected to the battery 17 that is a direct current power supply and converts an alternating current voltage input from the motor 12 and the generator 15 into a direct current voltage and supplies the same to the battery 17 or converts a direct current voltage from the battery 17 into an alternating current voltage and outputs the same to the motor 12 and the generator 15.

The regenerative brake device A has the motor 12, the inverter 16, the battery 17 and the like. The regenerative brake device A generates a regenerative braking force, which is based on a brake operating state detected by a brake operating state detection unit, for any one side (left and right front wheels FL, FR to be driven by the motor 12 serving as a driving source, in this exemplary embodiment) of the respective wheels FL, FR, RL, RR. The brake operating state is an operating state of a brake pedal 21, and includes a master cylinder pressure relating to a pedaling force on the brake pedal 21, a stroke amount of the brake pedal 21, a pedaling force on the brake pedal 21 and the like, for example. The brake operating state detection unit detects the brake operating state and includes a pressure sensor P detecting a master cylinder pressure, a pedal stroke sensor 21a detecting a stroke amount of the brake pedal 21, and the like.

The hybrid ECU 19 is connected with the inverter 16 so that they can communicate with each other. The hybrid ECU 19 derives a necessary engine output, electric motor torque and generator torque from an accelerator opening and a shift position (which is calculated from a shift position sensor input from a shift position sensor (not shown)), and transmits the derived engine output request value to the engine ECU 18 to thereby control the driving force of the engine 11. The hybrid ECU 19 controls the motor 12 and the generator 15 through the inverter 16 in response to the derived electric motor torque request value and generator torque request value. The hybrid ECU 19 is connected with the battery 17 and monitors a charged state of the battery 17, a charging current and the like. The hybrid ECU 19 is connected with an accelerator opening sensor (not shown) that is incorporated into an accelerator pedal (not shown) and detects an accelerator opening of a vehicle, and is also input with an accelerator opening signal from the accelerator opening sensor.

The fluid pressure brake apparatus B has a wheel brake device (basic fluid pressure braking force generation device), a brake actuator (control fluid pressure braking force generation device) 25 and the like. The fluid pressure brake apparatus B directly applies the fluid pressure braking force to the respective wheels FL, FR, RL, RR to thus brake the vehicle. The wheel brake device has a negative pressure booster 22 that is a boosting apparatus applying a suction negative pressure to a diaphragm to thus assist and boost (increase) a brake operating force, which is caused as the brake pedal 21 is stepped, a master cylinder 23 that generates a brake fluid (oil) having a fluid pressure (oil pressure), which is a basic fluid pressure corresponding to a brake operating force (i.e., operating state of the brake pedal 21) boosted by the negative pressure booster 22, and supplies the generated brake fluid to wheel cylinders WC1 to WC4, and a reservoir tank 24 that stores the brake fluid therein and supplies the brake fluid to the master cylinder 23. The brake actuator 25 is provided between the master cylinder 23 and the wheel cylinders WC1 to WC4.

Figure 2:
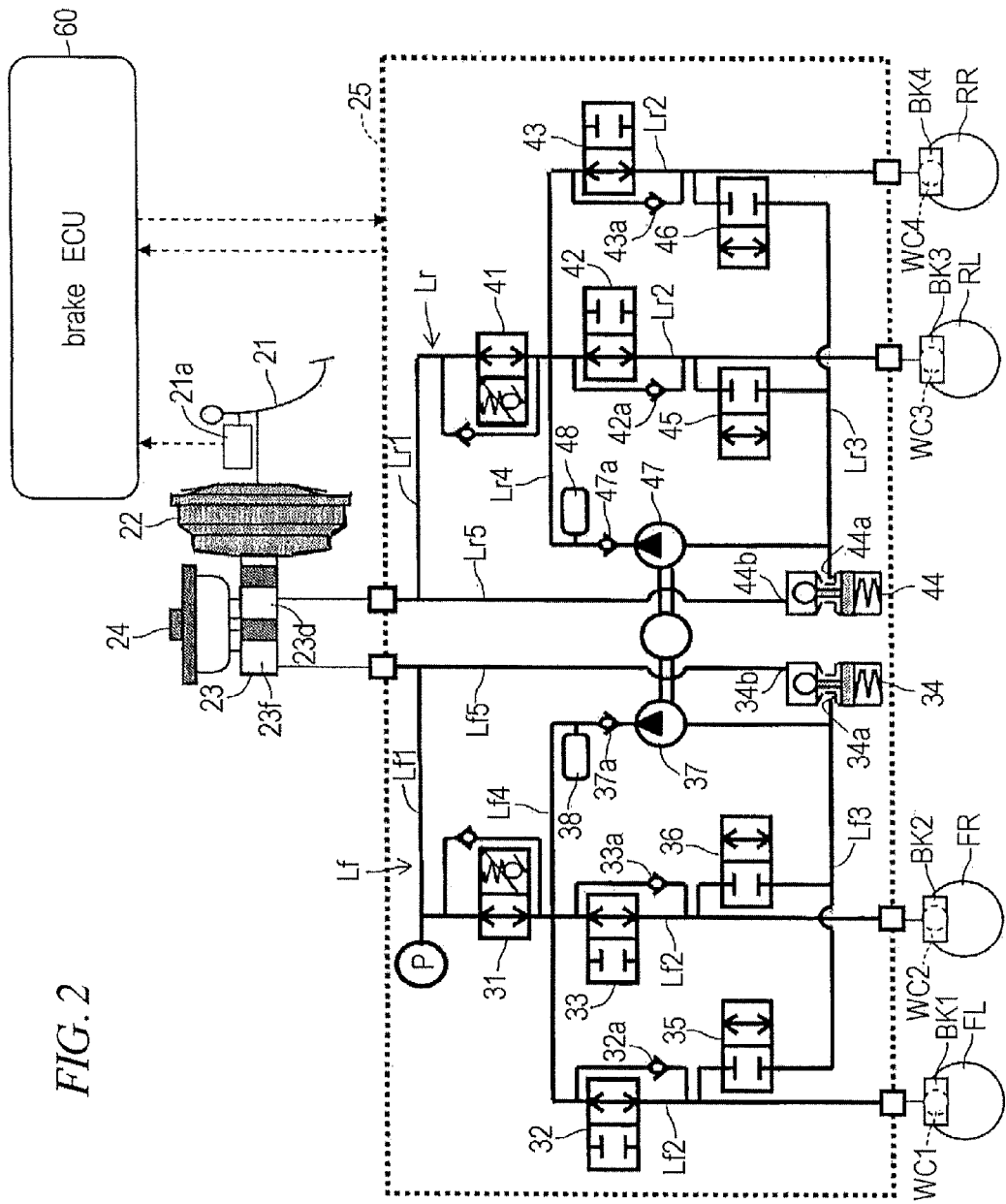
FIG. 2 shows a fluid pressure brake apparatus of the brake apparatus for a vehicle shown in FIG. 1.

As shown in FIG. 2, the wheel brake device generates the basic fluid pressure, which corresponds to the brake operating state resulting from the stepping on the brake pedal 21, by the master cylinder 23, and directly applies the generated basic fluid pressure to the wheel cylinders WC1, WC2, WC3, WC4 of the respective wheels FL, FR, RL, RR connected by oil paths Lf, Lr having the master cylinder 23 and fluid pressure control valves 31, 41, thereby generating a basic fluid pressure braking force corresponding to the basic fluid pressure for each of the wheels FL, FR, RL, RR. The brake actuator 25 applies a control fluid pressure, which is formed by driving of fluid pressure pumps 37, 47 and control of the fluid pressure control valves 31, 41 independently of the basic fluid pressure generated in correspondence to the brake operating state, to the wheel cylinders WC1, WC2, WC3, WC4 of the respective wheels FL, FR, RL, RR, thereby generating a control fluid pressure braking force for each of the wheels FL, FR, RL, RR.

A brake piping system of the fluid pressure brake apparatus B is configured by a front/rear piping system, and first and second fluid pressure chambers 23d, 23f of the master cylinder 23 are connected to the oil paths Lr, Lf, respectively. The oil path Lr enables the first fluid pressure chamber 23d and the wheel cylinders WC3, WC4 of the left and right rear wheels RL, RR to communicate with each other, and the oil path Lf enables the second fluid pressure chamber 23f and the wheel cylinders WC1, WC2 of the left and right front wheels FL, FR to communicate with each other. When the fluid pressure (basic fluid pressure, control fluid pressure) is supplied from the master cylinder 23 via the oil paths Lf, Lr, the respective wheel cylinders WC1, WC2, WC3, WC4 operate respective brake unit BK1, BK2, BK3, BK4, which are provided in correspondence to the respective wheel cylinders WC1, WC2, WC3, WC4, thereby applying the fluid pressure braking force (basic fluid pressure barking force, control fluid pressure braking force) to the respective wheels FL, FR, RL, RR. Each of the brake unit BK1, BK2, BK3, BK4 includes a disc brake, a drum brake and the like, and is configured to restrain rotation of a disc rotor, a brake drum and the like in which a friction member such as a brake pad, a brake shoe and the like is integrated with a wheel.

The brake actuator 25 is specifically described with reference to FIG. 2. The brake actuator 25 is generally well known and is configured by packaging the fluid pressure control valves 31, 41, pressure boost control valves 32, 33, 42, 43 and pressure reduction control valves 35, 36, 45, 46 configuring an ABS control valve, pressure adjusting reservoirs 34, 44, fluid pressure pumps 37, 47, an electric motor M and the like into one case. The fluid pressure control valves 31, 41, the fluid pressure pumps 37, 47 and the like configure a control fluid pressure generation device.

First, a configuration of a front wheel system of the brake actuator 25 is described. The oil path Lf is provided with the fluid pressure control valve 31 configured by a differential pressure control valve. The fluid pressure control valve 31 is switched between a communication state and a differential pressure state by the brake ECU 60. Typically, the fluid pressure control valve 31 is under communication state. However, when it is switched to the differential pressure state, it is possible to keep an oil path Lf2 of the wheel cylinders WC1, WC2-side at a pressure higher than an oil path Lf1 of the master cylinder 23-side by a predetermined control differential pressure. The control differential pressure is adjusted in response to the control current by the brake ECU 60. Specifically, the fluid pressure control valve 31 has a valve port having a small diameter and operates in a manner of a relief valve. That is, when a pressure of the wheel cylinder-side becomes higher than a pressure of the master cylinder-side by a predetermined pressure, the pressure of the wheel cylinder-side separates a valve body from a valve seat, so that a difference between the pressure of the wheel cylinder-side and the pressure of the master cylinder-side is maintained with the predetermined pressure. However, the fluid pressure control valve is also a linear control valve that controls a valve closing force resisting a valve opening pressure of the wheel cylinder pressure by controlling the control current and variably controls a difference between the pressure of the wheel cylinder-side and the pressure of the master cylinder-side by varying the valve opening pressure of the relief valve. Therefore, in order to normally operate the fluid pressure control valve 31, a relief flow rate for securing the valve opening pressure of the wheel cylinder pressure is required.

The oil path Lf2 is branched into two. One oil path is provided with the pressure boost control valve 32 that controls the boosting of the brake fluid pressure regarding the wheel cylinder WC1 in a boosting mode of the ABS control, and the other oil path is provided with the pressure boost control valve 33 that controls the boosting of the brake fluid pressure with respect to the wheel cylinder WC2 in the boosting mode of the ABS control. The pressure boost control valves 32, 33 are two-position valves that can control the communication/cut-off states by the brake ECU 60. When the pressure boost control valves 32, 33 are controlled at the communication state, it is possible to apply at least one of the basic fluid pressure of the master cylinder 23 and the control fluid pressure formed by the driving of the fluid pressure pump 37 and the control of the fluid pressure control valve 31 to the respective wheel cylinders WC1, WC2. The pressure boost control valves 32, 33 can perform the ABS control together with the pressure reduction control valves 35, 36 and the fluid pressure pump 37.

In the meantime, at the normal brake state at which the ABS control is not performed, the pressure boost control valves 32, 33 are controlled at the communication state all the time. The pressure boost control valves 32, 33 are provided with safety valves 32a, 33a in parallel, respectively, so that when the driver separates the foot from the brake pedal 21 at the ABS control, the brake fluid is correspondingly returned from the wheel cylinders WC1, WC2 to the reservoir tank 24.

The oil paths Lf2 between the pressure boost control valves 32, 33 and the respective wheel cylinders WC1, WC2 communicate with a reservoir hole 34a of the pressure adjusting reservoir 34 via an oil path Lf3. The oil path Lf3 is provided with the pressure reduction control valves 35, 36 that can control the communication/cut-off state by the brake ECU 60. The pressure reduction control valves 35, 36 are controlled at the cut-off state all the time at the normal brake state (at which the ABS does not operate), and allows the brake fluid to escape to the pressure adjusting reservoir 34 through the oil path Lf3 at the communication state, thereby controlling the brake fluid pressure in the wheel cylinders WC1, WC2 to thus prevent the wheels from being locked.

An oil path Lf4 connecting the oil paths Lf2 between the fluid pressure control valve 31 and the pressure boost control valves 32, 33 and the reservoir hole 34a of the pressure adjusting reservoir 34 is provided with the fluid pressure pump 37 together with a safety valve 37a. An oil path Lf5 is provided so as to connect the reservoir hole 34b of the pressure adjusting reservoir 34 to the master cylinder 23 via the oil path Lf1. The fluid pressure pump 37 is driven by the electric motor M in response to a command of the brake ECU 60. In a pressure reduction mode of the ABS control, the fluid pressure pump 37 sucks the brake fluid in the wheel cylinders WC1, WC2 or brake fluid reserved in the pressure adjusting reservoir 34 and returns the same to the master cylinder 23 via the fluid pressure control valve 31 under communication state. When forming the control fluid pressure for stably controlling a vehicle attitude, such as ESC control, traction control, brake assist and the like, the fluid pressure pump 37 sucks the brake fluid in the master cylinder 23 via the oil paths Lf1, Lf5 and the pressure adjusting reservoir 34 and discharges the same to the respective wheel cylinders WC1, WC2 via the oil paths Lf4, Lf2 and the pressure boost control valves 32, 33 under communication state so as to generate a control differential pressure in the fluid pressure control valve 31 switched to the differential pressure state, thereby applying the control fluid pressure. In the meantime, a damper 38 is disposed at an upstream side of the fluid pressure pump 37 on the oil path Lf4 so as to relieve a pulsation of the brake fluid discharged by the fluid pressure pump 37.

The oil path Lf1 is provided with a pressure sensor P detecting a master cylinder pressure that is a brake fluid pressure in the master cylinder 23, and a detection signal thereof is transmitted to the brake ECU 60. In the meantime, the pressure sensor P may be provided on an oil path Lr1. The master cylinder pressure is one of the brake operating states. The other brake operating state includes a pedal stroke of the brake pedal 21. The pedal stroke is detected by a pedal stroke sensor 21a annexed to the brake pedal 21. A detection signal thereof is transmitted to the brake ECU 60.

The rear wheel system of the brake actuator has the same configuration as the above front wheel system. An oil path Lr configuring the rear wheel system has oil paths Lr1 to Lr5, like the oil path Lf. The oil path Lr is provided with the fluid pressure control valve 41, which is the same as the fluid pressure control valve 31, and the pressure adjusting reservoir 44, which is the same as the pressure adjusting reservoir 34. The branched oil paths Lr2, Lr2 communicating with the wheel cylinders WC3, WC4 are provided with the pressure boost control valves 42, 43, which are the same as the pressure boost control valves 32, 33, and the oil path Lr3 is provided with the pressure reduction control valves 45, 46, which are the same as the pressure reduction control valves 35, 36. The oil path Lr4 is provided with the fluid pressure pump 47, a safety valve 47a and a damper 48, which are the same as the fluid pressure pump 37, the safety valve 37a and the damper 38. In the meantime, the pressure boost control valves 42, 43 are provided with safety valves 42a, 43a in parallel, respectively, which are the same as the safety valves 32a, 33a. By the brake actuator 25 configured as described above, the control fluid pressure, which is formed by the driving of the fluid pressure pumps 37, 47 and the control of the fluid pressure control valves 31, 41, is applied to the wheel cylinders WC1, WC2, WC3, WC4 of the respective wheels FL, FR, RL, RR. Thereby, it is possible to generate the control fluid pressure braking force for the respective wheels FL, FR, RL, RR.

The brake ECU 60 has a microcomputer (not shown). The microcomputer has an input/output interface, a CPU, a RAM and a ROM (all of which are not shown) that are connected via a bus. As shown in FIG. 1, the brake ECU 60 is connected to wheel speed sensors Sfl, Sfr, Srr, Srl, the pressure sensor P, the respective control valves 31, 32, 33, 35, 36, 41, 42, 43, 45, 46 and the electric motor M. The wheel speed sensors Sfl, Sfr, Srr, Srl are respectively provided in the vicinity of the respective wheels FL, FR, RL, RR and output pulse signals of frequencies corresponding to rotations of the respective wheels FL, FR, RL, RR to the brake ECU 60.

The CPU executes a braking control program for a vehicle to thus control the electric motor M of the fluid pressure brake apparatus B and the state switching or energization current of the respective control valves 31, 32, 33, 35, 36, 41, 42, 43, 45, 46 of the fluid pressure brake apparatus B, based on the detection signals from the respective sensors and an actual regenerative execution value from the hybrid ECU 19, thereby controlling the control fluid pressure to be applied to the wheel cylinders WC1 to WC4, i.e., the control fluid pressure braking force to be applied to the respective wheels FL, FR, RL, RR. The RAM temporarily stores parameters necessary to execute the braking control program for a vehicle, and the ROM stores the braking control program for a vehicle.

The brake ECU 60 is connected to the hybrid ECU 19 so that they can communicate with each other, and performs cooperation control of the regenerative brake performed by the motor 12 and the hydraulic brake so that a total braking force of a vehicle becomes equal to that of a vehicle having the hydraulic brake only. Specifically, the brake ECU 60 commands the hybrid ECU 19 to output a request regenerative braking force, which is an amount of the total braking force to be shared by the regenerative brake device, in response to the driver's braking request, i.e., braking operating state. Based on the input command of outputting the request regenerative braking force, the hybrid ECU 19 derives an actual regenerative execution value serving as an actual regenerative brake, considering the vehicle speed, the charged state of the battery and the like, controls the motor 12 via the inverter 16 so as to generate a regenerative braking force equivalent to the actual regenerative execution value, and outputs the derived actual regenerative execution value to the brake ECU 60.

Figure 3:
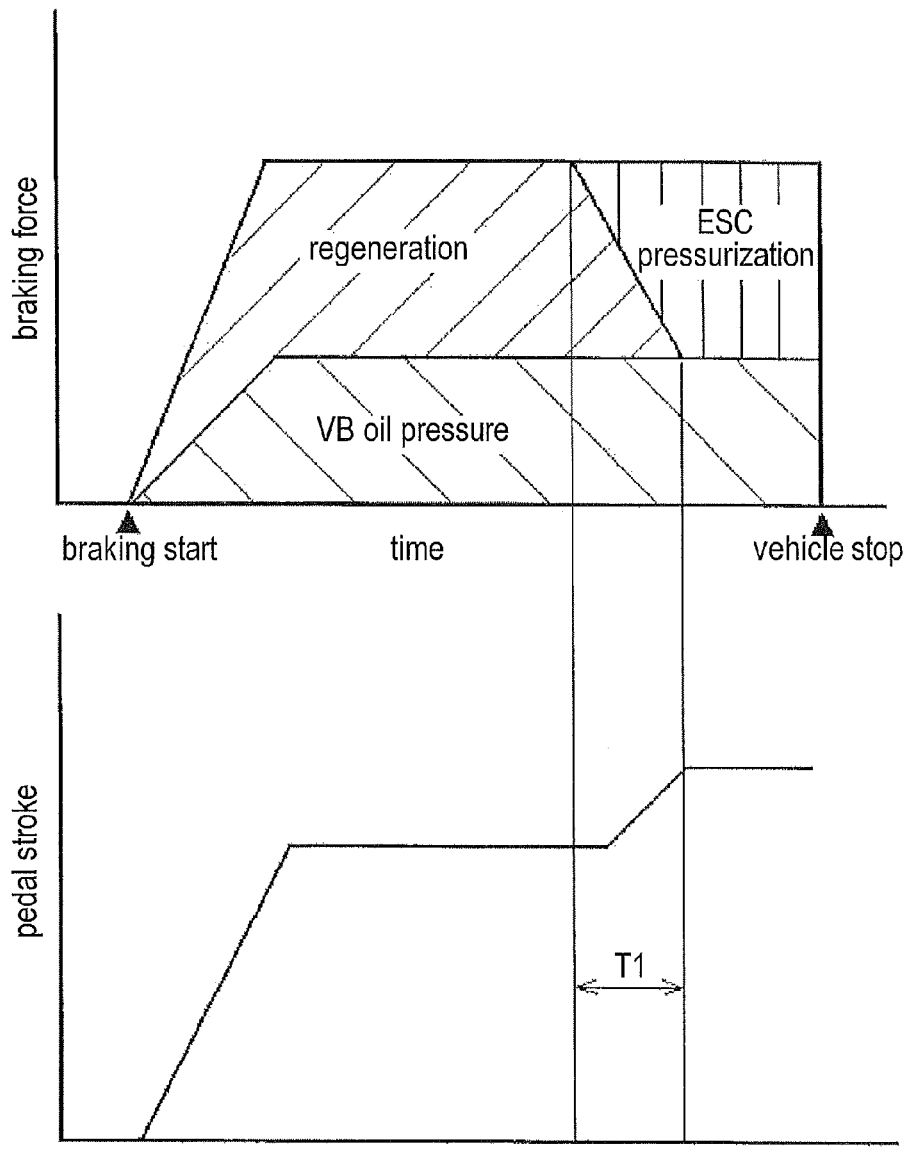
FIG. 3 shows a relation of a regenerative braking force and a fluid pressure braking force upon replacement therebetween.

Here, upon the regenerative cooperation, when the regenerative braking force (a regenerative part in FIG. 3) is decreased as the vehicle speed is decreased, the total braking force of the vehicle is decreased, so that only the basic fluid pressure braking force (a VB oil pressure part in FIG. 3) may be finally acquired. In this case, the control fluid pressure braking force is applied (an ESC pressurization part in FIG. 3) instead of the regenerative braking force, so that it is possible to compensate for a decreased part of the regenerative braking force and to thus keep the total braking force constant (hereinafter, the applying of the control fluid pressure braking force instead of the regenerative braking force is referred to as a replacement of the regenerative braking force and the control fluid pressure braking force). This replacement is performed for a long time. Hence, it is necessary for the electric motor M driving the fluid pressure pumps 37, 47 to have a long lifespan. In the braking control program for a vehicle of this exemplary embodiment, the rotation number of the electric motor M is reduced to enhance the durability thereof.

Figure 10:
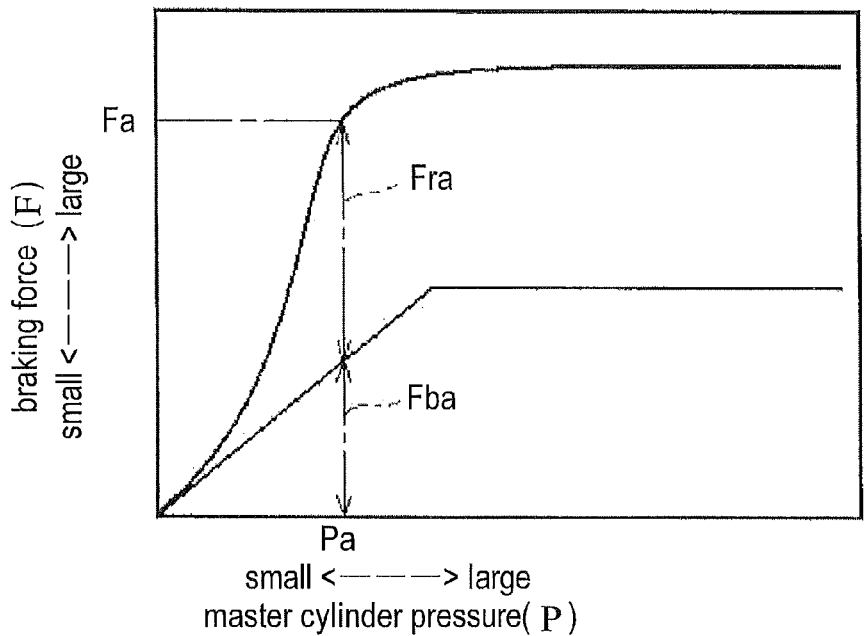
FIG. 10 shows a relation between a master cylinder pressure occurring in response to a brake operation and a total braking force (braking force expressed by a sum of a basic fluid pressure braking force and a regenerative braking force and a control fluid pressure braking force, if necessary) corresponding to an amount of the brake operation.

The brake ECU 60 has a storage device 61. The storage device 61 stores therein maps shown in FIGS. 10 to 14, for example, tables or calculation equations necessary to execute the braking control program for a vehicle. FIG. 10 shows a relation between a master cylinder pressure P occurring in response to a brake operation and a total braking force F (braking force expressed by a sum of a basic fluid pressure braking force and a regenerative braking force and a control fluid pressure braking force, if necessary) corresponding to an amount of the brake operation. In the meantime, a map, a table or a calculation equation showing a relation between a stroke of the brake pedal 21 and a request braking force, instead of the master cylinder pressure, may be stored.

Figure 11:
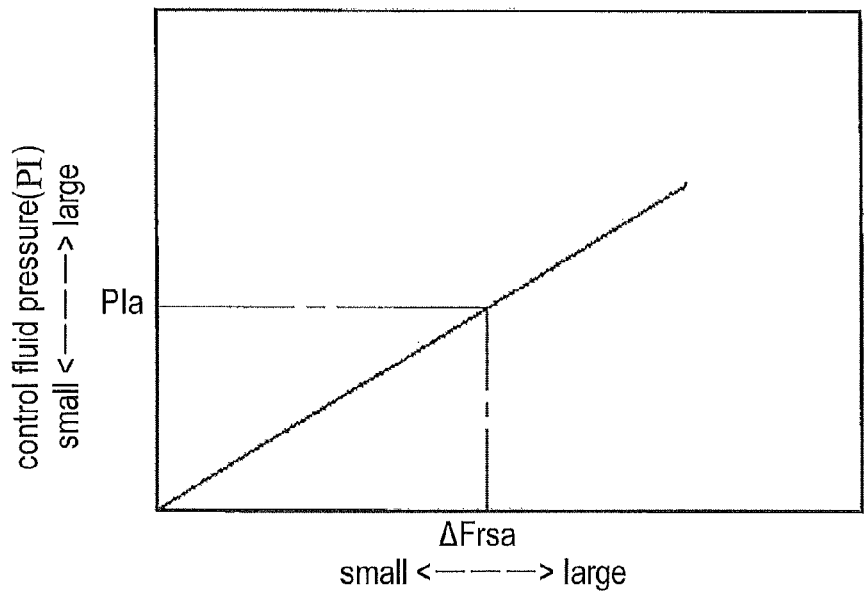
FIG. 11 shows a relation between a difference of a regenerative braking force corresponding to an amount of the brake operation and a regenerative braking force that can be generated by a regenerative brake device and a control fluid pressure of a fluid pressure control valve by a brake fluid that is discharged from a fluid pressure pump as an electric motor is driven.
Figure 12:
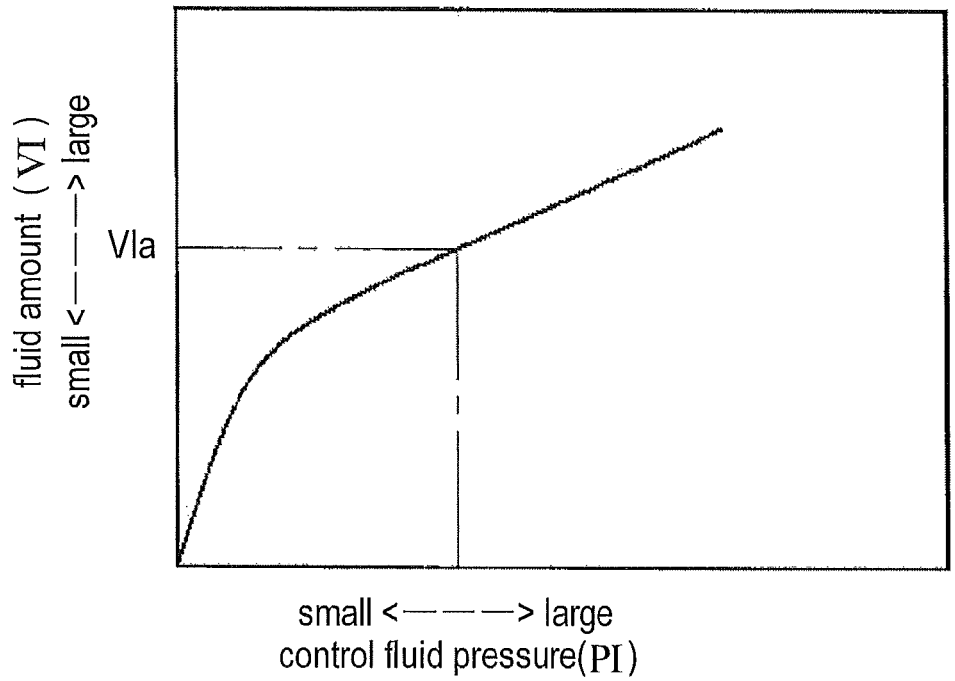
FIG. 12 shows a relation between a control fluid pressure of a fluid pressure control valve by a brake fluid that is discharged from a fluid pressure pump as an electric motor is driven and an accumulated fluid amount in a wheel cylinder to which the brake fluid is supplied.
Figure 13:
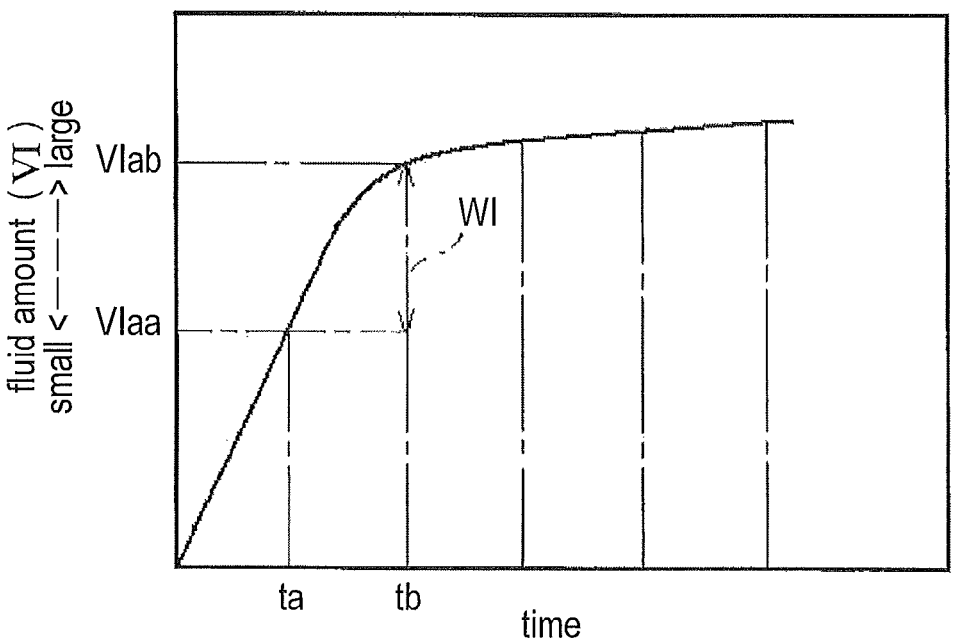
FIG. 13 shows a variation of the accumulated fluid amount of FIG. 12.
Figure 14:
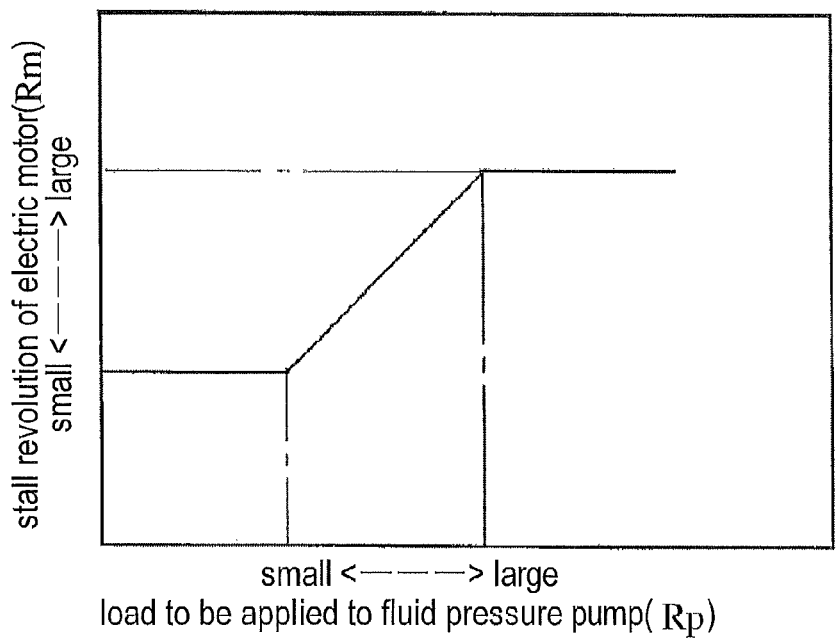
FIG. 14 shows a relation between a load that is applied to a fluid pressure pump as an electric motor is driven and a lowest necessary rotation number at which the electric motor does not stall.

FIG. 11 shows a relation between a difference ΔFrs of a regenerative braking force Fr corresponding to an amount of the brake operation and a regenerative braking force Fs that can be generated by the regenerative brake device A and a control fluid pressure PI of the fluid pressure control valves 31, 41 by a brake fluid that is discharged from the fluid pressure pumps 37, 47 as the electric motor M is driven. FIG. 12 shows a relation between the control fluid pressure PI of the fluid pressure control valves 31, 41 by the brake fluid that is discharged from the fluid pressure pumps 37, 47 as the electric motor M is driven and an accumulated fluid amount in the wheel cylinders WC1, WC2, WC3, WC4 to which the brake fluid is supplied. FIG. 13 shows a variation of the accumulated fluid amount of FIG. 12. FIG. 14 shows a relation between a load Rp that is applied to the fluid pressure pumps 37, 47 as the electric motor M is driven and a lowest necessary rotation number Rm at which the electric motor M does not stall. In the meantime, the stall of the electric motor M will be specifically described below.

Figure 4:
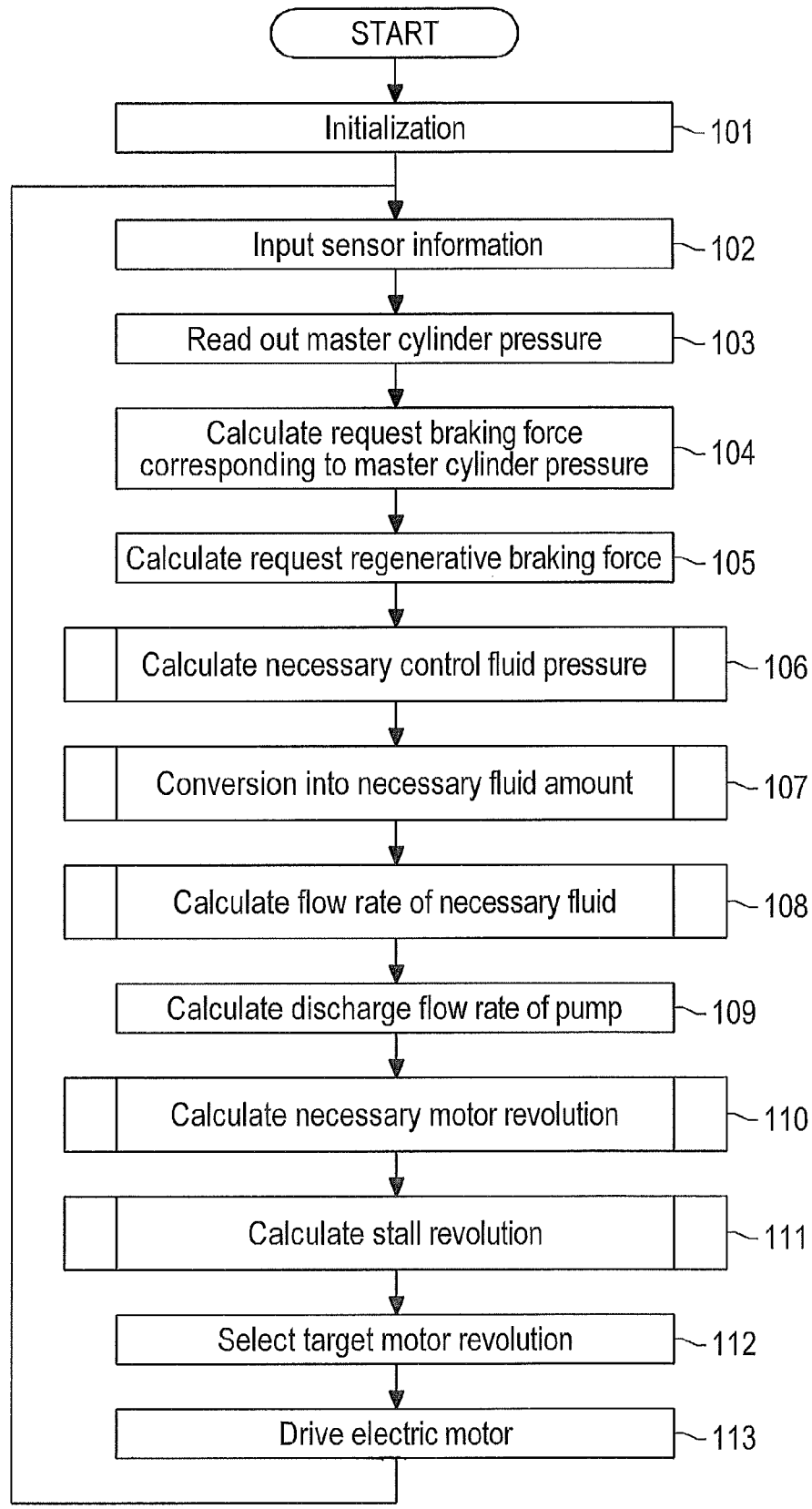
FIG. 4 is a flowchart for illustrating an operation of the brake apparatus for a vehicle shown in FIG. 1.
Figure 5:
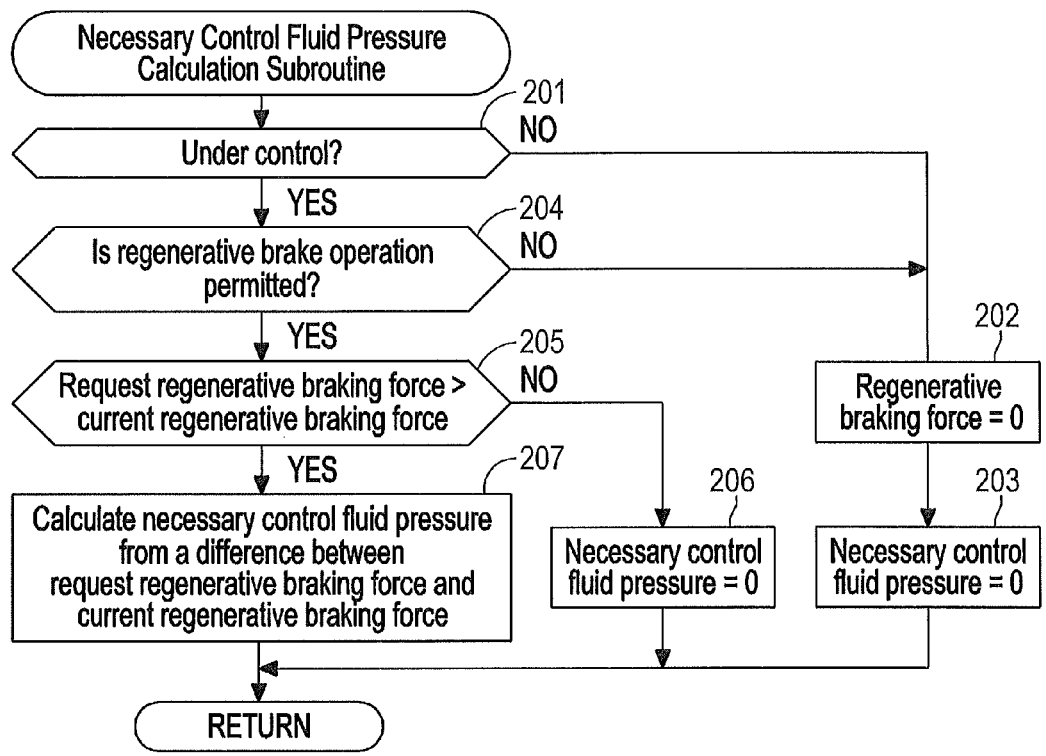
FIG. 5 is a flowchart for illustrating a necessary control fluid pressure calculation subroutine shown in FIG. 4.
Figure 6:
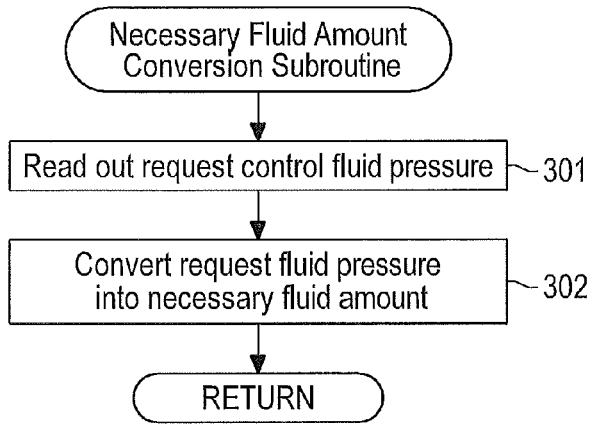
FIG. 6 is a flowchart for illustrating a necessary fluid amount conversion subroutine shown in FIG. 4.
Figure 7:
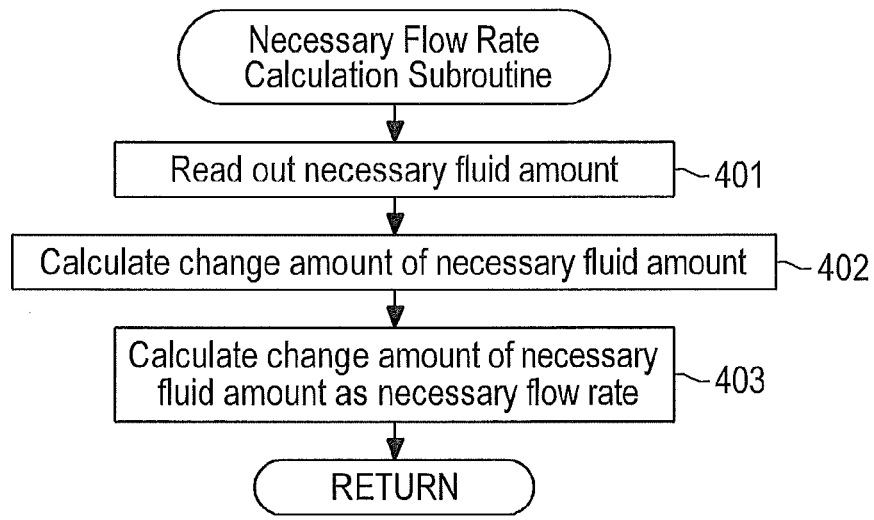
FIG. 7 is a flowchart for illustrating a necessary flow rate calculation subroutine shown in FIG. 4.
Figure 8:
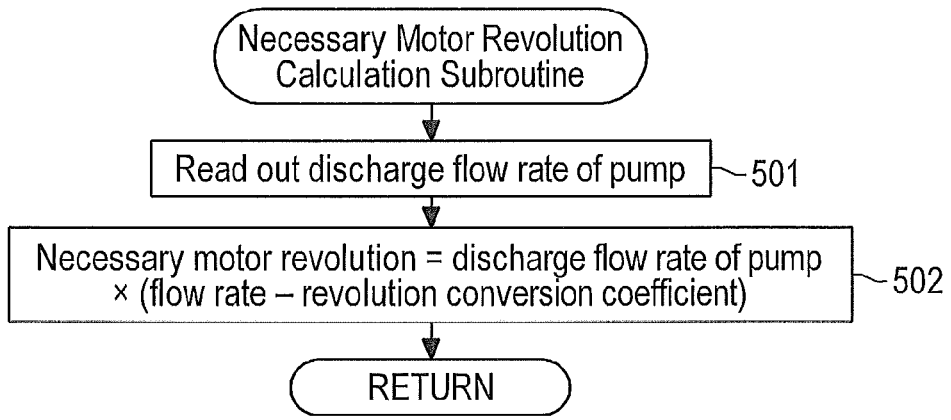
FIG. 8 is a flowchart for illustrating a necessary motor rotation number calculation subroutine shown in FIG. 4.
Figure 9:
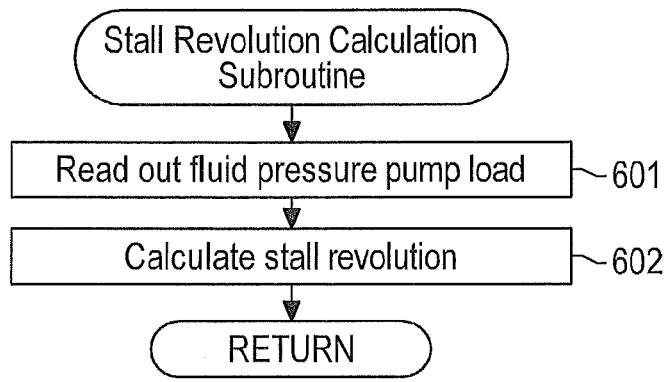
FIG. 9 is a flowchart for illustrating a stall rotation number calculation subroutine shown in FIG. 4.

In the below, operations of the brake apparatus for a vehicle are described with reference to flowcharts of FIGS. 4 to 9. In the meantime, the brake ECU 60 executes programs corresponding to the flowcharts every predetermined short time when an ignition switch (not shown) of the vehicle becomes on, for example. As shown in FIG. 4, after initialization (step 101), a variety of sensor information is input to the brake ECU 60 from the pressure sensor P detecting a master cylinder pressure, the pedal stroke sensor 21a detecting a stroke amount of the brake pedal 21 and the like (step 102).

The brake ECU 60 reads out the master cylinder pressure of the input various sensor information, which master cylinder pressure is the brake operating state (step 103). Then, the brake ECU calculates a braking force to be requested (hereinafter, referred to as the 'request braking force') and a basic fluid pressure braking force corresponding to the read master cylinder pressure, and calculates a regenerative braking force to be requested (hereinafter, referred to as the 'request regenerative braking force), based on the calculated request braking force and basic fluid pressure braking force (step 104, which corresponds to the 'request braking force calculation unit' and the 'basic fluid pressure braking force calculation unit', and step 105, which corresponds to the 'request regenerative braking force calculation unit'). Specifically, the brake ECU first calculates a request braking force Fa and a basic fluid pressure braking force Fba corresponding to the read master cylinder pressure Pa, based on a relation (refer to FIG. 10) between a master cylinder pressure P occurring in response to a brake operation and a total braking force F corresponding to an amount of the brake operation, and then calculates a request regenerative braking force Fra by subtracting the basic fluid pressure braking force Fba from the calculated request braking force Fa.

In order to generate the calculated request regenerative braking force, the brake ECU 60 calculates a control fluid pressure (hereinafter, referred to as the 'necessary control fluid pressure') necessary to generate a control fluid pressure braking force compensating for a deficiency of the regenerative braking force to be generated in the regenerative brake device A (step 106, which corresponds to the 'control fluid pressure setting unit'). Specifically, the brake ECU 60 executes a necessary control fluid pressure calculation subroutine shown in FIG. 5. That is, the brake ECU 60 determines whether the vehicle is under braking state (step 201). When the vehicle is not under braking state, the brake ECU sets "0" as the regenerative braking force and the necessary control fluid pressure (steps 202, 203) and returns to step 201. On the other hand, when it is determined in step 201 that the vehicle is under braking state, the brake ECU further determines whether the regenerative brake operation is permitted (step 204). When the regenerative brake operation is not permitted, the brake ECU sets "0" as the regenerative braking force and the necessary control fluid pressure (steps 202, 203) and returns to step 201.

On the other hand, when it is determined in step 204 that the regenerative brake operation is permitted, the brake ECU compares the request regenerative braking force calculated in step 105 with a regenerative braking force (hereinafter, referred to as the current regenerative braking force) that can be currently generated by the regenerative brake device A, and determines whether the request regenerative braking force is higher than the current regenerative braking force (step 205). When the request regenerative braking force is the current regenerative braking force or lower, the request regenerative braking force is satisfied by the current regenerative braking force. Hence, the brake ECU sets "0" as the necessary control fluid pressure (step 206) and returns to step 201.

In this case, the brake ECU 60 outputs the request generative braking force to the hybrid ECU 19. Then, the hybrid ECU 19 is input with a regenerative request value indicative of the request regenerative braking force, controls the motor 12 via the inverter 16 so as to generate the regenerative braking force, based on the regenerative request value, considering the vehicle speed, the charged state of the battery and the like, and outputs a current regenerative execution value indicative of the current regenerative braking force to the brake ECU 60. At this time, the wheels FL, FR, RL, RR are applied with the basic fluid pressure braking force having only the regenerative braking force added thereto.

On the other hand, when it is determined in step 205 that the request regenerative braking force is higher than the current regenerative braking force, the brake ECU calculates a necessary control fluid pressure for supplementing a difference between the request regenerative braking force and the current regenerative braking force (step 207) and returns to step 201. Specifically, the brake ECU calculates a difference ΔFrsa between the request regenerative braking force Fra and the current regenerative braking force Fsa, and calculates a necessary control fluid pressure PIa, based on a relation (which is pre-stored and shown in FIG. 11) between a difference ΔFrs of the regenerative braking force Fr corresponding to an amount of the brake operation and the regenerative braking force Fs that can be generated by the regenerative brake device A and the control fluid pressure PI of the fluid pressure control valves 31, 41 by the brake fluid that is discharged from the fluid pressure pumps 37, 47 as the electric motor M is driven.

Returning to FIG. 4, the brake ECU 60 converts the necessary control fluid pressure calculated in step 207 into a fluid amount (hereinafter, referred to as the necessary fluid amount) necessary to generate a control fluid pressure braking force compensating for a deficiency of the regenerative braking force to be generated in the regenerative brake device A (step 107). Specifically, the brake ECU 60 executes a necessary fluid amount conversion subroutine shown in FIG. 6. That is, the brake ECU 60 reads out the necessary control fluid pressure (step 301), converts the calculated necessary control fluid pressure PIa into a necessary fluid amount VIa (step 302), based on a relation (which is pre-stored and shown in FIG. 12) between the control fluid pressure PI of the fluid pressure control valves 31, 41 by the brake fluid that is discharged from the fluid pressure pumps 37, 47 as the electric motor M is driven and an accumulated fluid amount VI in the wheel cylinders WC1, WC2, WC3, WC4 to which the brake fluid is supplied, and then returns to step 301.

Returning to FIG. 4, the brake ECU 60 calculates a necessary flow rate, based on the necessary fluid amount converted in step 302 (step 108). Specifically, the brake ECU 60 executes a necessary flow rate calculation subroutine shown in FIG. 7. That is, as shown in FIG. 13, the brake ECU 60 reads out a necessary fluid amount every predetermined time, for example, a necessary fluid amount VIaa at time ta and a necessary fluid amount VIab at time tb (step 401) and calculates a change amount VIab−VIaa of the necessary fluid amount during predetermined time tb−ta (step 402). Then, the brake ECU sets the calculated change amount VIab−VIaa of the necessary fluid amount as a necessary flow rate WI (step 403) and returns to step 401.

Returning to FIG. 4, the brake ECU 60 calculates a pump-necessary discharge flow rate of the fluid pressure pumps 37, 47, based on the necessary flow rate calculated in step 403 (step 109). Specifically, the brake ECU 60 adds a relief flow rate Wr necessary to operate the fluid pressure control valves 31, 41 to the necessary flow rate WI and sets the resulting flow rate as a pump-necessary discharge flow rate (WI+Wr). The brake ECU 60 calculates a necessary motor rotation number of the electric motor M, based on the calculated pump-necessary discharge flow rate (step 110, which corresponds to the 'target rotation number setting unit'). Specifically, the brake ECU 60 executes a necessary motor rotation number calculation subroutine shown in FIG. 8. That is, the brake ECU 60 reads out the pump discharge flow rate (WI+Wr) (step 501), multiplies the read pump discharge flow rate (WI+Wr) by a flow rate-rotation number conversion coefficient k and sets the result thereof as a necessary motor rotation number k(WI+Wr) of the electric motor M (step 502) and then returns to step 501. The flow rate-rotation number conversion coefficient k is a coefficient indicative of a pump discharge flow rate of the fluid pressure pumps 37, 47 per one rotation number of the electric motor M. The flow rate-rotation number conversion coefficient k indicates a predetermined rotation number (which is indicated by a ratio) upon discharge of a predetermined flow rate, varies depending on a pump load and determines a relation indicating how to set a value of the ratio for any pump load when designing a pump. The flow rate-rotation number conversion coefficient k is determined from a relation between a preset pump load and the flow rate-rotation number conversion coefficient k (rev·s/cc) and the necessary control fluid pressure PIa read out in step 207, i.e., a pump load Rp that will be described later.

Returning to FIG. 4, the brake ECU 60 calculates a lowest necessary rotation number (hereinafter, referred to as a stall rotation number) at which the electric motor M does not stall (step 111, which corresponds to the 'target rotation number setting unit'). Specifically, the brake ECU 60 executes a stall rotation number calculation subroutine shown in FIG. 9. That is, the brake ECU 60 reads out the load Rp of the fluid pressure pumps 37, 47 (step 601). Specifically, the brake ECU uses the necessary control fluid pressure PIa, which was calculated in step 207, as the load (Rp=PIa), calculates a stall rotation number Rm corresponding to the load Rp of the fluid pressure pumps 37, 47, based on the load Rp and a relation (which is pre-stored and shown in FIG. 14) between the load Rp that is applied to the fluid pressure pumps 37, 47 as the electric motor M is driven and the stall rotation number Rm of the electric motor M (step 602) and then returns to step 601.

Here, the rotation of the fluid pressure pumps 37, 47 is correlated with the rotation of the electric motor M, and an amount of work (load) that is made by the fluid pressure pumps 37, 47 and is indicated by a value obtained by multiplying the control fluid pressure and the control fluid flow rate is correlated with an amount of work (load) that is made by the electric motor M. A value obtained by multiplying the control fluid pressure and the control fluid flow rate in the fluid pressure pumps 37, 47 is equivalent to a load that is applied to the fluid pressure pumps 37, 47 as the electric motor M is driven. The amount of work that is made by the electric motor M is correlated with a lowest necessary rotation number at which the electric motor M does not stall. Accordingly, as shown in FIG. 14, the load that is applied to the fluid pressure pumps 37, 47 as the electric motor M is driven is correlated with the stall rotation number Rm of the electric motor M, and the stall rotation number Rm of the electric motor M can be calculated, considering the load Rp that is applied to the fluid pressure pumps 37, 47 as the electric motor M is driven.

Returning to FIG. 4, the brake ECU 60 compares the necessary motor rotation number calculated in step 502 with the stall rotation number calculated in step 602 and selects the larger one as the target rotation number (step 112, which corresponds to the 'target rotation number setting unit'). Then, the brake ECU drives the electric motor M, based on the selected target rotation number (step 113) and returns to step 102 to thus repeat the above processing. The fluid pressure brake apparatus B applies the basic fluid pressure braking force corresponding to the master cylinder pressure and the control fluid pressure braking force corresponding to the target rotation number, and the regenerative brake device A applies the current regenerative braking force. Thereby, the total braking force where the control fluid pressure braking force and the regenerative braking force are added to the basic fluid pressure braking force is applied to the wheels.

In the meantime, it is necessary to set a differential pressure, which should be added to the M/C pressure, for the fluid pressure control valves 31, 41 so that the fluid pressure pumps 37, 47 are operated so as to generate the brake fluid pressure corresponding to the deficiency of the regenerative braking force in the wheel cylinders WC1 to WC4. More specifically, the fluid pressure control valves 31, 41 are the linear control valves, and a valve opening pressure in a relief function thereof is controlled by the control current. However, when the stall rotation number (the minimum rotation number peculiar to a motor and pre-determined depending on a motor load) is selected as the target rotation number in step 112 and the fluid pressure pumps 37, 47 are controlled so that the motor rotation number becomes the stall rotation number, an actual discharge flow rate of the fluid pressure pumps 37, 47 exceeds a necessary discharge amount. The remaining flow rate obtained by subtracting the necessary discharge amount from the actual discharge flow rate of the fluid pressure pumps 37, 47 passes through the fluid pressure control valves 31, 41. Therefore, the flow rate passing through the fluid pressure control valves 31, 41 becomes excessive, and a difference between the actual differential pressure occurring in the fluid pressure control valves 31, 41, i.e., an actual valve opening pressure and a set valve opening pressure is caused due to the influence of the pressure loss. Thereby, an operating point of the fluid pressure pumps 37, 47 is changed, so that the discharge amount is changed and the necessary flow rate for the wheel cylinder W/C cannot be pneumatically transported correctly. As a result, it is not possible to correctly provide a necessary pressurization part for the wheel cylinder W/C by the pump pressurization when the regenerative braking force proves deficient.

Figure 16:
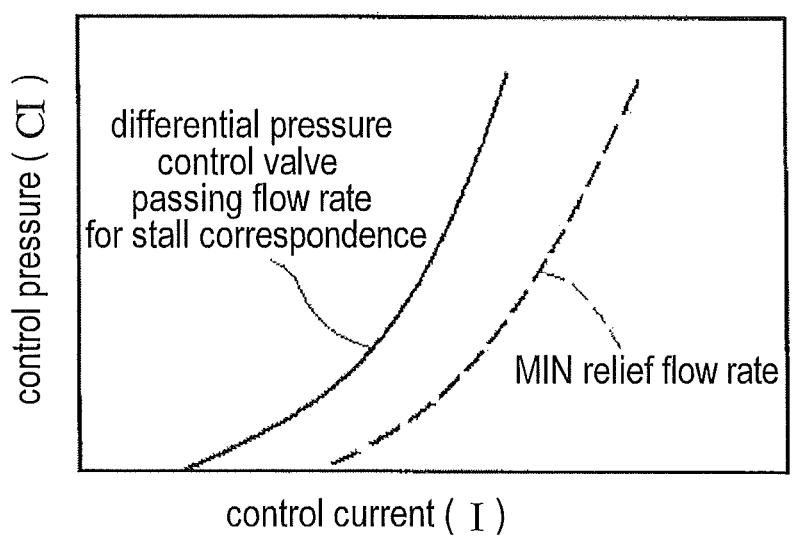
FIG. 16 shows a relation between a control fluid pressure of a fluid pressure control valve and a control current.

Therefore, in this exemplary embodiment, a differential pressure control valve passing flow rate is calculated as follows. When the stall rotation number is selected as the target motor rotation number in step 112, the brake ECU calculates a pump discharge amount, which is converted from the stall rotation number, as a stall corresponding discharge amount (calculates a pump discharge amount from the flow rate-rotation number conversion coefficient corresponding to a load and the stall rotation number), and calculates a differential pressure control valve passing flow rate as a differential pressure control valve passing flow rate for stall correspondence by subtracting the necessary flow rate from the pump discharge amount. FIG. 16 shows a map that determines the control current I regarding the control fluid pressure PI. When the stall rotation number is selected as the target rotation number, the brake ECU calculates a control current from the solid line of FIG. 16 corresponding to the calculated differential pressure control valve passing flow rate for stall correspondence.

On the other hand, when the necessary motor rotation number is selected as the target motor rotation number in step 112, the brake ECU calculates a control current from a MIN relief flow rate (refer to the dotted line in FIG. 16) indicating a preset relief flow rate Wr necessary to operate the fluid pressure control valves 31, 41. As shown in FIG. 16, the differential pressure control valve passing flow rate for stall correspondence is higher than the MIN relief flow rate that is a relief flow rate necessary to normally operate the fluid pressure control valves 31, 41, and a control current value relative to a predetermined control fluid pressure becomes smaller when the stall rotation number is selected as the target rotation number.

Figure 15:
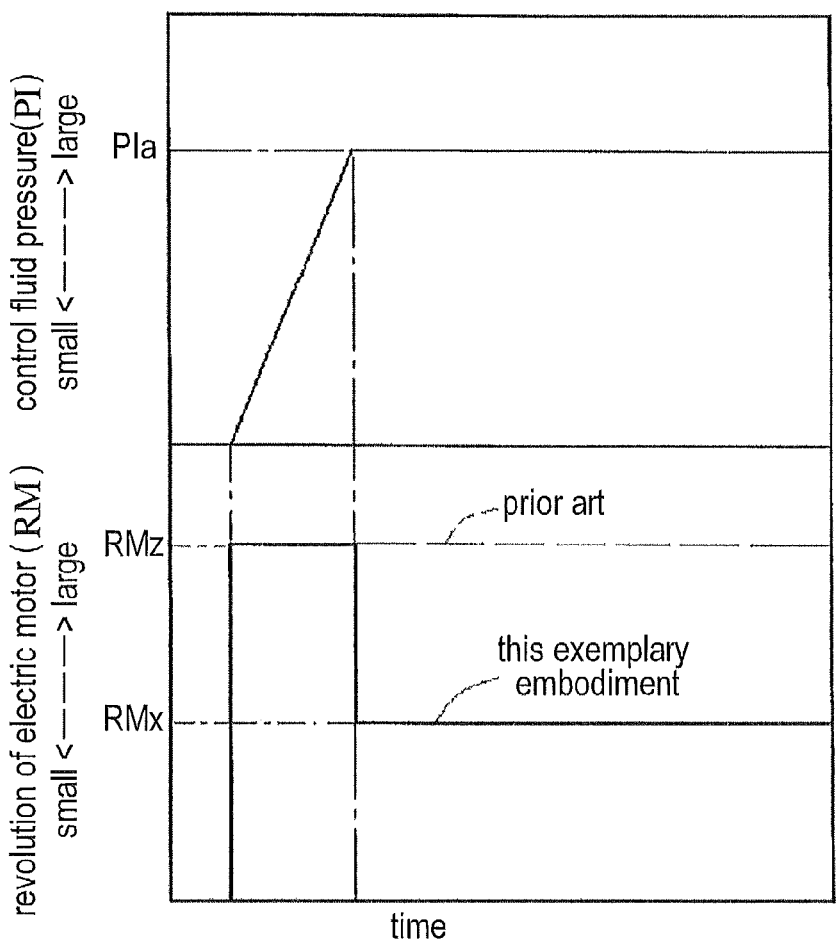
FIG. 15 shows effects of reducing a rotation number of an electric motor relative to a necessary control fluid pressure according to an exemplary embodiment and the prior art.

As described above, according to this exemplary embodiment, the target rotation number of the electric motor M is set, based on the brake fluid amount that is supplied to the wheel cylinders WC1 to WC4 based on the change in the control fluid pressure, and the relief flow rate necessary to operate the fluid pressure control valves 31, 41. That is, the necessary flow rate of the fluid pressure pumps 37, 47 is calculated from the change amount of the control fluid pressure for obtaining the braking force corresponding to the brake operation and the relief flow rate necessary to normally operate the fluid pressure control valves 31, 41 is added to the calculated necessary flow rate of the fluid pressure pumps 37, 47, so that the minimum necessary discharge flow rate (pump-necessary discharge flow rate) of the fluid pressure pumps 37, 47 is calculated. Since the fluid pressure pumps 37, 47 are driven by the electric motor M, it is possible to convert the calculated pump-necessary discharge flow rate into the necessary motor rotation number of the electric motor M. By doing so, the necessary motor rotation number RMx is calculated. Thereby, as shown in FIG. 15, while the rotation number RM of the electric motor M should be maintained at the high rotation number RMz (which is shown with the broken line) so as to keep the necessary control fluid pressure PIa according to the prior art, the rotation number RM of the electric motor M can be reduced from the high rotation number RMz to the low rotation number RMx after the necessary control fluid pressure PIa is reached, according to this exemplary embodiment (which is shown with the solid line). Therefore, it is possible to enhance the durability of the electric motor M, to reduce the average power consumption of the electric motor M and to reduce the operating noise of the electric motor M. It is possible to make the fluid pressure control valves 31, 41 smaller by setting the relief flow rate of the fluid pressure control valves 31, 41 to be the minimum necessary optimal amount.

The control fluid pressure is set based on the difference between the request regenerative braking force and the current regenerative braking force that can be currently generated by the regenerative brake device A. Thereby, it has only to generate the minimum necessary control fluid pressure for acquiring the braking force corresponding to the brake operation and it is possible to reduce the rotation number of the electric motor M. Therefore, it is possible to enhance the durability of the electric motor M, to reduce the average power consumption of the electric motor M and to reduce the operating noise of the electric motor M. Since the regenerative brake device A can apply all the current regenerative braking force to the wheels FL, FR, it is possible to increase the use efficiency of the regenerative energy.

The target rotation number is set with the larger one of the necessary motor rotation number equivalent to the pump-necessary discharge flow rate and the lowest necessary rotation number at which the electric motor M does not stall. Thereby, the control fluid pressure generation device can reduce the rotation number of the electric motor M within a range capable of securing the pressure adjusting performance. Since it is possible to increase the control fluid pressure by the fluid pressure pumps 37, 47 at the early stage and to thus apply the control fluid pressure braking force with promptitude, it is possible to keep the control on the control fluid pressure at a high performance state.

The lowest necessary rotation number is set based on the load that is applied to the fluid pressure pumps 37, 47. Thereby, even when the rotation number of the electric motor M is reduced at the time that the discharge flow rate of the fluid pressure pumps 37, 47 is varied, it is possible to prevent the stall of the electric motor M.

Based on the fluid pressure control valve passing flow rate, which is obtained by subtracting the brake fluid amount to be supplied to the wheel cylinders from the pump discharge amount calculated from the lowest necessary rotation number, and the correlation between the applied current and the control fluid pressure different for each fluid pressure control valve passing flow rate, the current value at which the target control fluid pressure is obtained is calculated to control the current to be applied to the fluid pressure control valves. Thereby, in a case where the stall rotation number is selected as the target rotation number, even when the actual discharge flow rate of the fluid pressure pumps 37, 47 exceeds the necessary discharge amount and thus the flow rate passing through the fluid pressure control valves 31, 41 becomes excessive, the current value at which the target control fluid pressure is obtained is calculated and becomes the indicator current for the fluid pressure control valves 31, 41. Therefore, it is possible to appropriately maintain the discharge amounts of the fluid pressure pumps 37, 47 and the fluid pressure pumps 37, 47 can appropriately pneumatically transport the necessary flow rate to the wheel cylinders.

In the brake apparatus for a vehicle of the above exemplary embodiment, the fluid pressure brake apparatus B and the regenerative brake device A are cooperatively controlled. However, the brake apparatus for a vehicle can be used as a brake apparatus for a vehicle having a traction control device, a brake assist control device, a hill start control device, an active cruise control device and the like. That is, in order to apply a braking force, which is necessary depending on the traveling state of the vehicle, to the wheels, the electric motor is rotated with the target rotation number, so that the brake fluid having a relief flow rate necessary to operate the fluid pressure control valves is circulated from the fluid pressure pumps to the fluid pressure control valves and the control current is applied to the fluid pressure control valves. Thereby, the brake apparatus for a vehicle can be used as a brake apparatus for a vehicle having a control fluid pressure generation device that generates a control fluid pressure, which is set in the fluid pressure control valves in response to the request power.

In the traction control, when the slipping amount of the driving wheels FL, FR exceeds a predetermined value and also increases, the fluid pressure is supplied from the control fluid pressure generation device to the wheel cylinders WC1, WC2 of the driving wheels FL, FR, the fluid pressure is controlled by the fluid pressure control valves 31, 41 in response to the slipping amount. When the slipping amount exceeds a predetermined value and does not increase, the pressure generation device is stopped, the fluid pressure, which is controlled by the fluid pressure control valves 31, 41 in response to the slipping amount, is sealed in the wheel cylinders WC1, WC2 of the driving wheels FL, FR. When the slipping amount is a predetermined value or smaller, the wheel cylinders WC1, WC2 of the driving wheels FL, FR are connected to the pressure adjusting reservoirs 34, 44. Thereby, the fluid pressure braking force is applied to the wheels by the brake unit in response to the slipping amount.

In the brake assist control, when the brake is urgently applied or when a strong braking force is generated, the fluid pressure is supplied from the pressure generation device to the wheel cylinders WC1, WC2 of the driving wheels FL, FR and the fluid pressure is controlled by the fluid pressure control valves 31, 41 so that it becomes a fluid pressure higher than the fluid pressure to be supplied from the master cylinder 23. Thereby, the high fluid pressure braking force is applied to the wheels by the brake unit.

In the hill start control, when a vehicle starts on a sloping road, the fluid pressure is supplied from the pressure generation device to the wheel cylinders WC1, WC2 of the driving wheels FL, FR and the fluid pressure is controlled to be a stop state-keeping fluid pressure by the fluid pressure control valves 31, 41. Thereby, the fluid pressure braking force that keeps the vehicle on the sloping road at a stopped state is applied to the wheels by the brake unit.

In the active cruise control, in order to maintain an inter-vehicular distance at a predetermined value or larger, the fluid pressure is supplied from the pressure generation device to the wheel cylinders WC1, WC2 of the driving wheels FL, FR and the fluid pressure is controlled by the fluid pressure control valves 31, 41. When the inter-vehicular distance becomes the predetermined value or smaller, the fluid pressure braking force is automatically applied to the wheels by the brake unit.

In the above exemplary embodiment, the brake piping system of the fluid pressure brake apparatus B is provided at the front and rear of the FF vehicle. However, it may be provided at the front and rear of an FR vehicle. The negative pressure booster 22 is used as the boosting apparatus. However, a boosting apparatus that accumulates a fluid pressure generated by a pump in an accumulator and performs the boosting by using the fluid pressure may be used. In the above exemplary embodiment, the flow rate-rotation number conversion coefficient k is determined as a value that is varied in response to the pump load. However, the invention is not limited thereto. For example, when the flow rate-rotation number conversion coefficient k is designed so that it is constant with regard to the pump load when designing the pump, a constant value may be adopted regardless of the pump load.

What is claimed is:

1. A brake apparatus for a vehicle comprising:
    a master cylinder configured to generate a master cylinder fluid pressure corresponding to a brake operation;
    a wheel brake device that is provided for each wheel and configured to apply a braking force to the wheels by supplying a brake fluid from the master cylinder to wheel cylinders;
    a control fluid pressure generation device including:
        a fluid pressure control valve connected between the master cylinder and the wheel cylinders; and
        a fluid pressure pump having a discharge port communicating between the fluid pressure control valve and the wheel cylinders and a suction port communicating between the master cylinder and the fluid pressure control valve;
    an electric motor configured to drive the fluid pressure pump;
    a control fluid pressure setting unit configured to set a control fluid pressure to be added to the master cylinder fluid pressure so that a wheel cylinder fluid pressure occurring in the wheel cylinder is higher than the master cylinder fluid pressure;
    wherein the control fluid pressure generation device rotates the electric motor with a target rotation number to circulate a brake fluid, whose flow rate is a relief flow rate, from the fluid pressure pump to the fluid pressure control valve and applies a control current to the fluid pressure control valve to thus generate the control fluid pressure in the fluid pressure control valve, the relief flow rate being a flow rate to normally operate the pressure control valve, and
    a target rotation number setting unit configured to calculate a brake fluid amount that is supplied to the wheel cylinders based on a change in the control fluid pressure, calculate a discharge flow rate of the fluid pressure pump based on the brake fluid amount and the relief flow rate, and set a target rotation number of the electric motor based on the discharge flow rate.

2. The brake apparatus according to claim 1, wherein the target rotation number setting unit sets, as the target rotation number, a larger one of a necessary motor rotation number equivalent to the discharge flow rate and a lowest necessary rotation number at which the electric motor does not stall.

3. The brake apparatus according to claim 2, wherein the target rotation number setting unit sets the lowest necessary rotation number, based on a load that is applied to the fluid pressure pump.

4. The brake apparatus according to claim 2, wherein the target rotation number setting unit includes a control unit that, if the target rotation number setting unit sets the lowest necessary rotation number as the target rotation number, calculates a current value at which the target control fluid pressure is obtained, based on a fluid pressure control valve passing flow rate, which is obtained by subtracting a brake fluid amount to be supplied to the wheel cylinders from a pump discharge amount calculated from the lowest necessary rotation number, and a correlation between the applied current and the control fluid pressure different for each fluid pressure control valve passing flow rate, and controls a current to be applied to the fluid pressure control valve.

5. The brake apparatus according to claim 1 further comprising:
    a regenerative brake device configured to generate a regenerative braking force for the wheels;

a request braking force calculation unit configured to calculate a request braking force corresponding to an amount of the brake operation;

a basic fluid pressure braking force calculation unit configured to calculate a basic fluid pressure braking force to be generated by the master cylinder fluid pressure; and a request regenerative braking force calculation unit configured to calculate a request regenerative braking force by subtracting the basic fluid pressure braking force from the request braking force, wherein the control fluid pressure setting unit sets the control fluid pressure based on a difference between the request regenerative braking force and a current regenerative braking force that the regenerative brake device can currently generate.

6. The brake apparatus according to claim 5, wherein the target rotation number setting unit sets, as the target rotation number, a larger one of a necessary motor rotation number equivalent to the pump-necessary discharge flow rate and a lowest necessary rotation number at which the electric motor does not stall.

7. The brake apparatus according to claim 1, wherein the control fluid pressure generation device calculates a flow rate of the brake fluid to be supplied to the wheel cylinder based on the brake fluid amount and calculates the discharge flow rate by adding the relief flow rate to the brake fluid amount.

* * * * *